United States Patent [19]

Endo

[11] Patent Number: 4,632,543
[45] Date of Patent: Dec. 30, 1986

[54] OPTICAL RADAR SYSTEM FOR VEHICLES

[75] Inventor: Hiroshi Endo, Yokosuka, Japan

[73] Assignee: Nissan Motor Company, Limited, Japan

[21] Appl. No.: 579,694

[22] Filed: Feb. 13, 1984

[30] Foreign Application Priority Data

May 6, 1983 [JP] Japan .................. 58-79141

[51] Int. Cl.⁴ .......... G01C 3/08; G01C 1/00; G01B 11/26; G01P 3/36
[52] U.S. Cl. ................... 356/5; 356/141; 356/28; 180/167
[58] Field of Search .......... 356/4, 5, 28, 141, 152; 180/165, 167, 169

[56] References Cited

U.S. PATENT DOCUMENTS

| | | | |
|---|---|---|---|
| 3,661,459 | 5/1972 | Aoki | 356/4 |
| 3,781,111 | 12/1973 | Fletcher et al. | 356/5 |
| 4,457,621 | 7/1984 | Harris et al. | 356/5 |
| 4,516,853 | 5/1985 | Pearson | 356/5 |

FOREIGN PATENT DOCUMENTS

| | | |
|---|---|---|
| 0036333 | 9/1981 | European Pat. Off. . |
| 5586000 | 12/1978 | Japan . |
| 80/00186 | 9/1980 | PCT Int'l Appl. . |
| 714360 | 8/1954 | United Kingdom . |
| 1105758 | 3/1968 | United Kingdom . |
| 1405241 | 9/1975 | United Kingdom . |
| 1533426 | 11/1978 | United Kingdom . |
| 2044035 | 10/1980 | United Kingdom . |
| 1583664 | 1/1981 | United Kingdom . |

Primary Examiner—Stephen C. Buczinski
Assistant Examiner—Melissa Koltak
Attorney, Agent, or Firm—Lane and Aitken

[57] ABSTRACT

An optical radar system for vehicles has a stationary receiver and a transmitter which scans the road surface ahead of the vehicle, the scan area being shifted in accordance with the direction of steering of the vehicle. The scan area is covered by periodically sweeping a narrow-beam pulse laser through the designated scan area and monitoring the return lag of pulses reflected by objects in the scan area. The scan area is centered over the longitudinal axis of the vehicle while the latter is moving straight ahead. The axis of the scan area is shifted in proportion to the orientation of the steering wheel of the vehicle.

24 Claims, 21 Drawing Figures

OPTICAL RADAR SYSTEM FOR VEHICLES

BACKGROUND OF THE INVENTION

This invention relates to an optical radar system for sensing the distance to obstacles using a search beam, and more particularly, to an optical radar system having a variable sensing area and hence improved performance using a search beam which can swivel in accordance with the steering angle of a steering wheel.

One conventional radar system for vehicles is disclosed in Tokkaisho (Japanese unexamined published patent application) No. 55-86000 published on June 28, 1980. The radar system disclosed in this application is an electromagnetic wave radar system. However, recently, it has been suggested to use optical radar employing a laser search beam in vehicles.

This optical radar system includes a control unit which produces and processes electrical signals, an optical transmitter which radiates a search beam having a predetermined wavelength, and an optical receiver which collects light reflected by reflective objects and transduces the collected light into a corresponding electrical signal.

Furthermore, the control unit includes a pulse modulator which produces a trigger signal input to a signal processing unit, the signal being generated simultaneously with a drive pulse signal. Drive pulse signal causes a light-emitting element fixed to the optical transmitter to produce a corresponding light pulse. The light pulse is then focused by a lens into a beam which is transmitted in front of the vehicle. Weak light reflected by an object is focused by a large-diameter lens. The reflected light focused by the lens passes through an optical filter which filters out background noise (external lights such as solar light, artificial illumination, etc.), enters a light-receiving surface of a light-sensitive element positioned at the focal point of the lens, and is transduced into a corresponding electrical reflection signal consisting of narrow, low-amplitude pulses. The reflection signal is input to, amplified and shaped by a wide-band amplifier of the control unit into a high-amplitude pulse signal which is then output to the signal processing unit. The processing unit derives the propagation delay of reflection light pulse relative to the light pulse radiated by the optical transmitter from the time relationship between the trigger signal and the pulse signal, thereby allowing calculation of the distance to the object in a well-known manner.

In the above radar, the beam transmitted by the optical transmitter is designed so as to have a slight angle of divergence in order to ensure detection of objects in front of and relatively close to the vehicle.

When the angle of divergence and direction of the beam are fixed, the detection distance limit (beyond which objects are not regarded as obstacles even if sensed) is restricted so as not to detect objects in the adjacent lanes while the vehicle travels along a straight road. An object present outside of the detection distant limit in front of the vehicle cannot be detected.

On the other hand, when the vehicle is travelling along a curved road, the beam is greatly offset out of the vehicle lane, so that a preceding vehicle travelling along the curved lane cannot be tracked. The deviation of the beam from the curved lane increases as the radius of curvature of the road decreases.

SUMMARY OF THE INVENTION

It is an object of this invention to provide an optical radar system which is capable of increasing the detection distance limit without sensing objects in the adjoining lanes and which can reliably detect the preceding vehicles even through curves.

This invention provides an optical radar system for a vehicle, comprising: an optical transmitter means for transmitting a search beam toward possible objects in a road along which the vehivle is travelling; means for repeatedly scanning the search beam parallel to and across the road surface; an optical receiver means for receiving the light of the search beam reflected by the objects; and means for determining the distances from the vehicle to the objects on the basis of the timing relationship between the transmitted search light and the received light.

This invention also provides a method of detecting and ranging objects in a road on which a vehicle travels, comprising the steps of (a) transmitting a search beam toward the objects; (b) scanning the transmitted search beam periodically across the road surface; (c) receiving light of the search beam reflected by the objects; and (d) determining the distances from the vehicle to the objects on the basis of the timing relationship between the transmitted search beam and the received light.

DETAILED DESCRIPTION OF THE INVENTION

Figure 1:
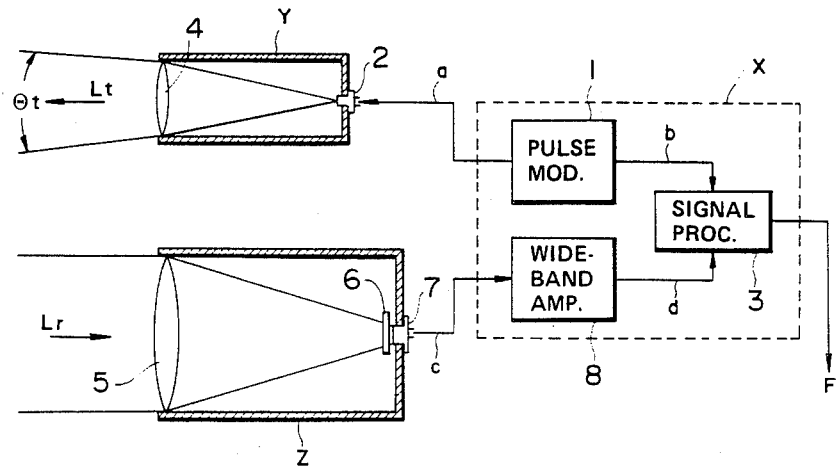
FIG. 1 is a block diagram of a prior art optical radar system for vehicles.

In order to facilitate understanding of this invention, first, a prior art optical radar system will be described. An exemplary prior art optical radar is illustrated in FIG. 1 of the drawings.

This optical radar includes a control circuit X which produces and processes electrical signals, an optical transmitter Y which radiates a search beam having a predetermined wavelength, and an optical receiver Z which collects light reflected by objects and transduces the collected light into a corresponding electrical signal.

Figure 2:
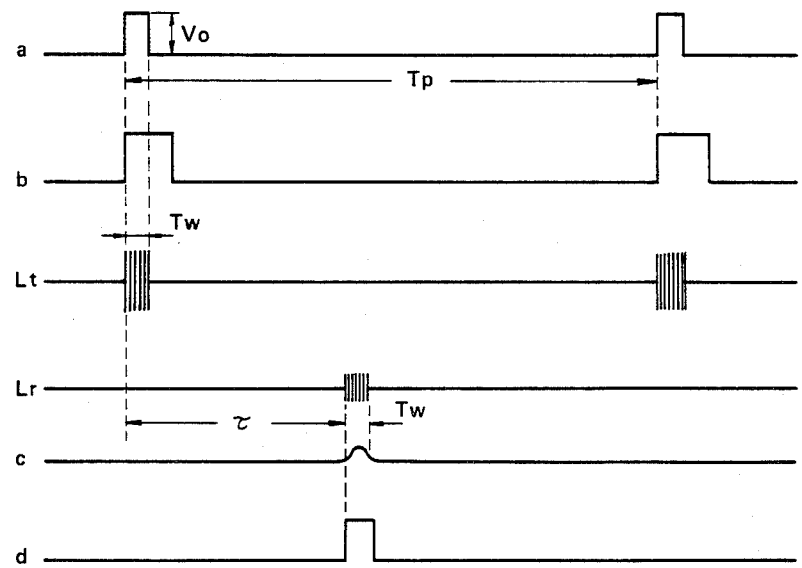
FIG. 2 is a timing chart of the main output waveforms of the radar system of FIG. 1.

In addition, a pulse modulator 1 sends a trigger signal b to a signal processing unit 3, the pulses of signal b being generated simultaneously with those of a drive pulse signal a, which has a period Tp (about 100 μs), a pulse width Tw (about 50 ns) and a peak value Vo, as shown in FIG. 2.

Drive pulse signal a causes a light-emitting element 2 fixed to optical transmitter Y to produce a corresponding light pulse Lt having a wavelength $\lambda$ and a pulse width Tw. Light pulse Lt is then focused by a lens 4 into a beam having a angle of divergence $\theta t$. The weak light Lr reflected by objects within the path of the beam is focused by a large-diameter lens 5. Reflected light Lr collected by lens 5 passes through an optical filter 6 which filters out background noise (external lights such as solar light, artificial illumination, etc.), enters a light-receiving surface of a light-sensitive element 7 positioned at the focal point of lens 5, and is transduced into a corresponding electrical reflection signal c consisting of narrow, low-amplitude pulses. Reflection signal c is amplified and shaped by a wide-band amplifier 8 into a high-amplitude signal d which is then output to signal processing unit 3. Unit 3 derives the propagation delay $\tau$ of reflection light pulse Lr relative to light pulse Lt radiated by optical transmitter Y from the time relationship between trigger signal b and pulse signal d, thereby allowing calculation of the distance R to the reflection object from the following formula:

$$R = c \cdot \tau / 2$$

where the units of R and $\tau$ are meters and seconds, respectively, and c is about $3 \times 10^8$ meters/second.

Figure 3:
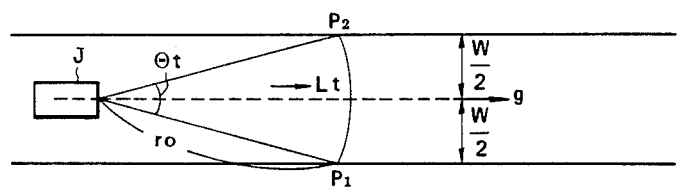
FIG. 3 is a diagram of the detection area of the prior art optical radar along a straight road.

In the above radar system, the beam Lt transmitted by optical transmitter Y is designed so as to have a angle of divergence of about 70 mrad and an optical axis g normal to the front of a vehicle J as shown in FIG. 3 in order to ensure detection of an objects in front of and relatively close to vehicle J.

When the angle of divergence $\theta t$ and direction of beam Lt are fixed, as above, a detection distance limit $r_0$ (beyond which objects are not regarded as obstacles even if sensed) is restricted when the vehicle is travelling along a straight road as shown in FIG. 3. That is, since one vehicle lane has a width W of about 5 m on an average road, and assuming the distance covered by the beam Lt on either side of the lane is the detection distance limit $r_0$, $r_0 \approx W/\theta_t = 70$ m, so that an object present 100 m or more in front of the vehicle cannot be sensed.

Figure 4:
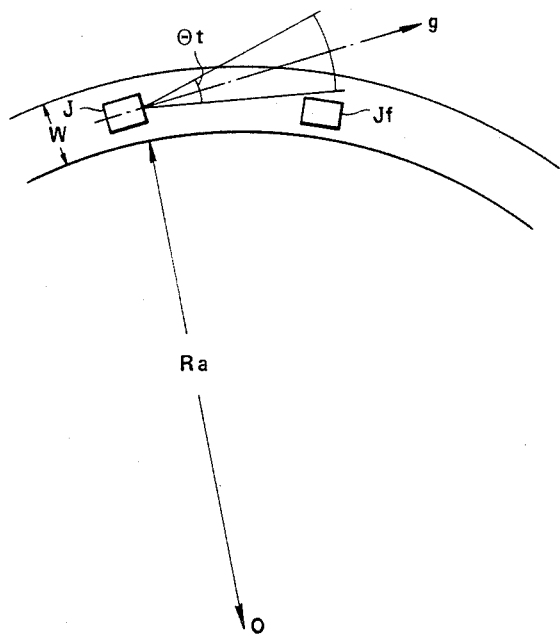
FIG. 4 is an illustration of a detection area along a curved road.

As shown in FIG. 4, when vehicle J is travelling along a curved road, the beam Lt falls well outside of the vehicle lane, so that a preceding vehicle Jf travelling along the curved lane cannot be sensed. The deviation of the beam Lt from the curved lane increases as the radius of curvature Ra decreases.

Figure 5:
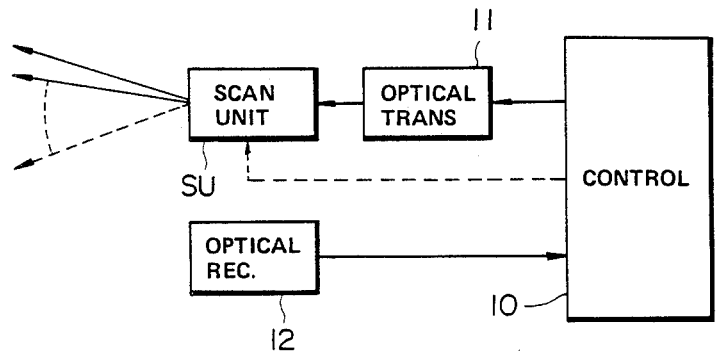
FIG. 5 is a block diagram of the radar system of the present invention.

In FIG. 5, an optical radar system for vehicles according to this invention includes an optical transmitter 11 which transmits a search beam substantially parallel to a road surface, an optical receiver 12 which receives light reflected by objects and a control unit 10 which senses the distance to reflective objects in accordance with the time relationship between the transmitted search beam and the received light, and a scan unit SU which repeatedly swivels the axis of the search beam to cause the light signal to sweep repeatedly through a scanning field.

Figure 6:
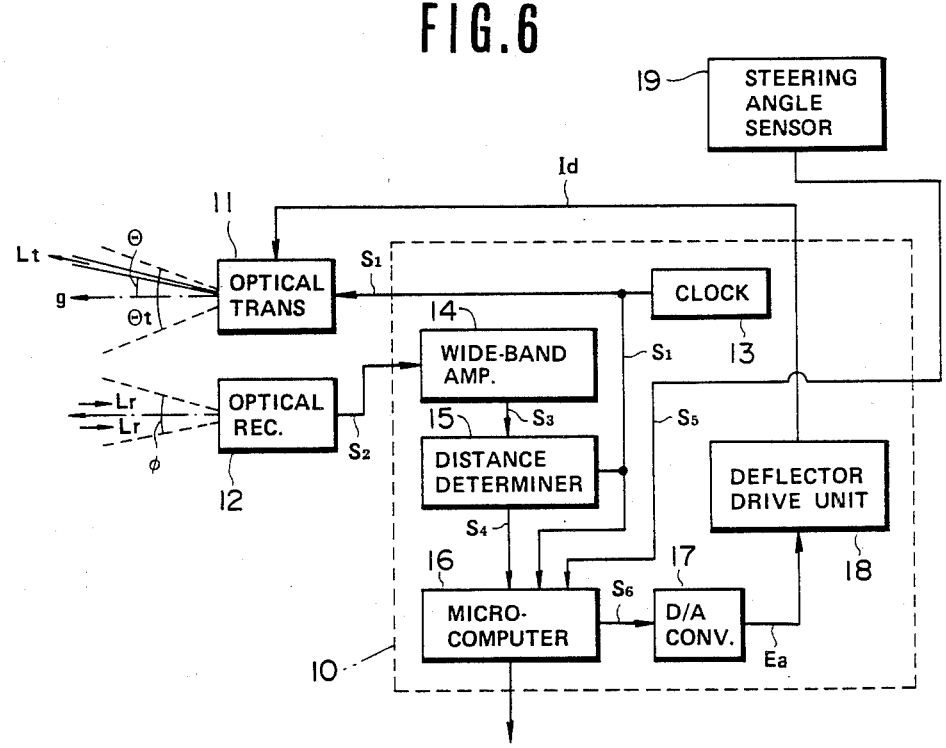
FIG. 6 is a more detailed block diagram of the optical radar system of FIG. 5.
Figure 7:
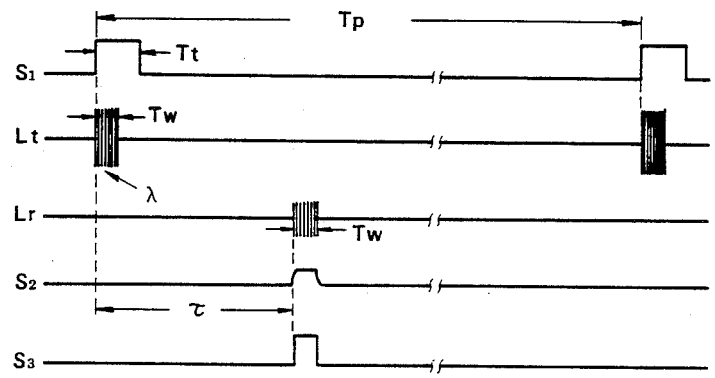
FIG. 7 is a timing chart of the main output waveforms of the radar system of FIG. 6.

In more detail, in FIG. 6, control unit 10 includes a clock generator 13, a wide-band amplifier 14, a distance determiner 15, a microcomputer 16, a D/A converter 17 and a deflector drive unit 18. Microcomputer 16 receives a signal $S_5$ indicative of the actual steering angle of the steering wheel from a steering angle sensor 19. As shown in FIG. 7, clock generator 13 produces a trigger signal $S_1$ having a period Tp ($\approx 0.1$ ms) and a pulse width Tt ($\approx 100$ ns) supplied to optical transmitter 11. Transmitter 11 is responsive to trigger signal $S_1$ to produce a search beam pulse Lt having a wavelength $\lambda$, a pulse width Tw ($\lesssim 50$ ns) and a repetition period Tp.

The part Lr of search beam Lt reflected by an object (not shown) is sensed by optical receiver 12 which produces an electrical reception signal $S_2$ which is in turn amplified and shaped by wide-band amplifier 14 and then sent to distance determiner 15. Determiner 15 produces a distance data signal $S_4$ corresponding to the distance to the object in accordance with a delay time $\tau$ of reception signal $S_2$ relative to trigger signal $S_1$ and supplies the data signal $S_4$ to microcomputer 16.

Figure 8:
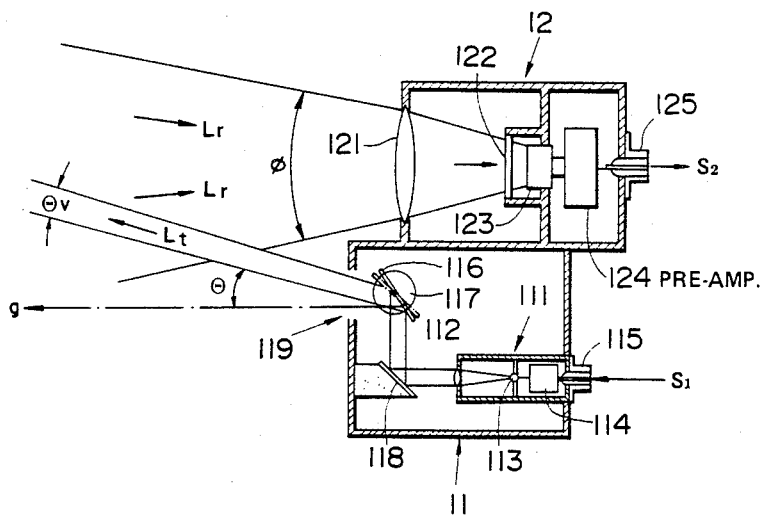
FIG. 8 is a cross-sectional view of an optical transmitter and receiver portion of the radar system of FIG. 6.

FIG. 8 is a cross-sectional view of optical transmitter 11 and receiver 12, taken parallel to the road surface. As shown in the figure, the housings of transmitter 11 and receiver 12 are juxtaposed into an integral unit. Optical receiver 12 includes a large-diameter convex lens 121 which collects light Lr reflected by the object, an optical filter 122 which filters out background noise such as solar light, artificial illumination, etc., (filter 122 may be of an interference type having a pass band, the central wavelength of which is $\lambda$), a photoelectric transducer 123 (such as a PIN photodiode) having a relatively large light receiving surface (the diameter of which is 7-10 mm) which receives the reflection light Lr passing through filter 122, and a preamplifier 124 which has a band width of tens of MHz and a gain of 20-30 dB and which amplifies the signal from transducer 123 and outputs a signal $S_2$ via a coaxial connector 125.

Figure 9:
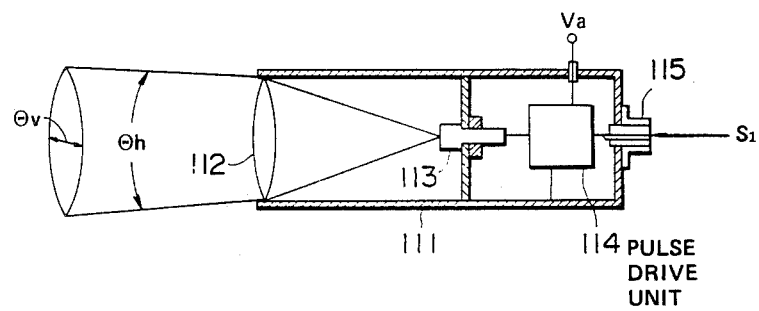
FIG. 9 is a cross-sectional view of the main part of the transmitter.
Figure 10:
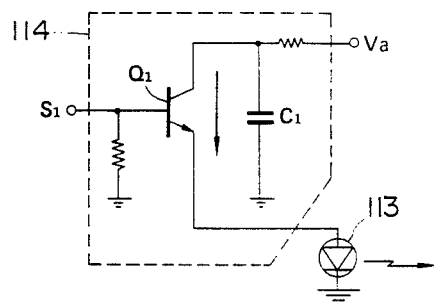
FIG. 10 is a circuit diagram of an embodiment of a pulse drive circuit of FIG. 9.

Transmitter 11 includes an optical transmitting unit 111, a deflection mirror 116 which pivots or swivels optical signal Lt transmitted by transmitting unit 111 parallel to the road surface to cause the signal Lt to scan across the road, and a mirror rotating device 117. As shown in FIG. 9, transmitting unit 111 includes a pulse drive unit 114 and laser diode 113 in a hollow cylindrical housing and a convex lens 112 mounted in an opening in the housing. Pulse drive circuit 114 is so designed, as shown in FIG. 10, that when trigger signal $S_1$ from clock generator 13 is output to pulse drive unit 114 via coaxial connector 115, it triggers a transistor Q1 to render same conductive, thereby supplying a charge (of about 150 V) stored in a capacitor C1 connected to the collector of transistor Q1 to a laser diode 113 connected between the emitter of transistor Q1 and ground.

Search beam Lt transmitted by transmitting unit 111 is reflected along a predetermined path by a reflection mirror 118 mounted directly in front of convex lens 112 and then reflected by deflection mirror 116 and radiated through a window 119 in the front end of the vehicle.

Figure 11:
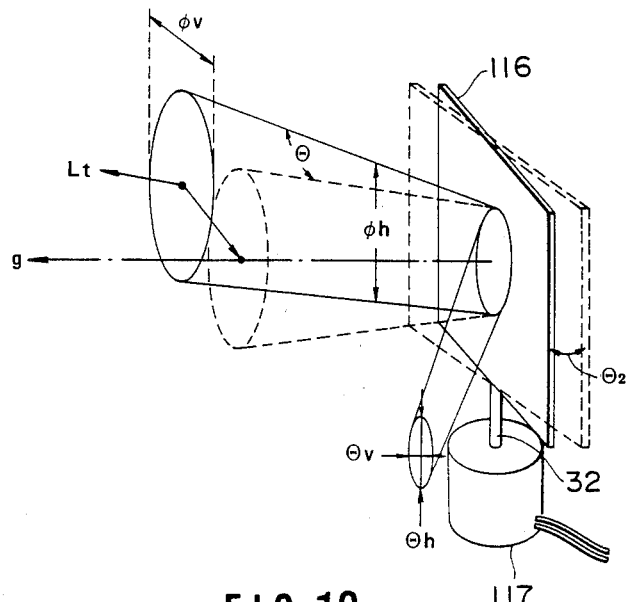
FIG. 11 is a diagrammatic perspective view of a deflection mirror and a mirror rotating device of the radar system of FIG. 6.

Deflection mirror 116 is mounted on a shaft 32 of mirror rotating device 117, as shown in FIG. 11. Shaft 32 is rotated through a predetermined angle corresponding to the electric current Id supplied by deflector drive unit 18 to mirror drive device 117, thereby rotating deflection mirror 116. The deflection angle $\theta$ of search beam Lt reflected by mirror 116 is twice the rotation angle $\theta_2$ of mirror 116, that is, $$\theta = 2\theta_2 \qquad (1)$$

Figure 12:
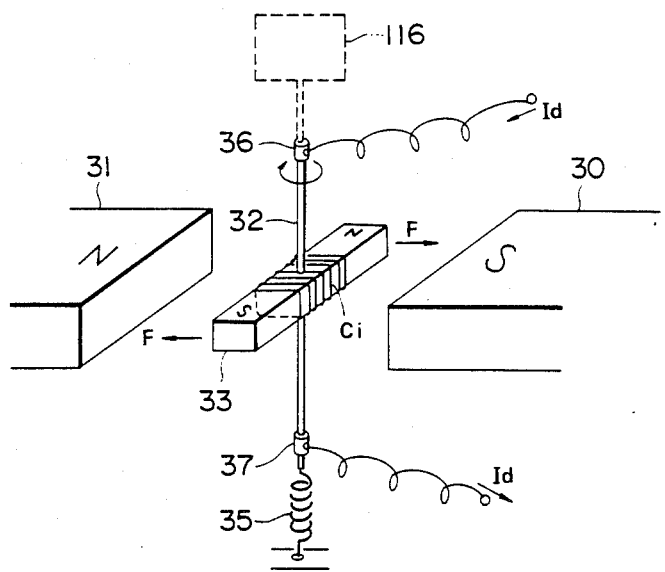
FIG. 12 is a diagrammatic perspective view of the combined internal components of the mirror drive device.

FIG. 12 briefly illustrates the principle of mirror rotating device 117 which includes two opposing permanent magnets 30 (S-polarity) and 31 (N-polarity) and a movable electromagnet 33 with a coil Ci wound thereon disposed between the two permanent magnets and a vertical shaft 32 extending through the midpoint of magnet 33. Deflection mirror 116 is fixed to the top of shaft 32 and a spring 35 is mounted between the lower end of shaft 32 and the casing.

Coil Ci is supplied with electric current Id by deflector drive unit 18, D/A converter 17 and microcomputer 16 via slip rings 36 and 37 provided on the upper and lower ends of shaft 32. Current Id magnetizes movable electromagnet 33, resulting in a force F having a direction shown by the arrows in the figure, so that movable magnet 33 stops at the position where force F and the return force of spring 37 balance after shaft 32 has rotated through a corresponding angle.

Figure 13:
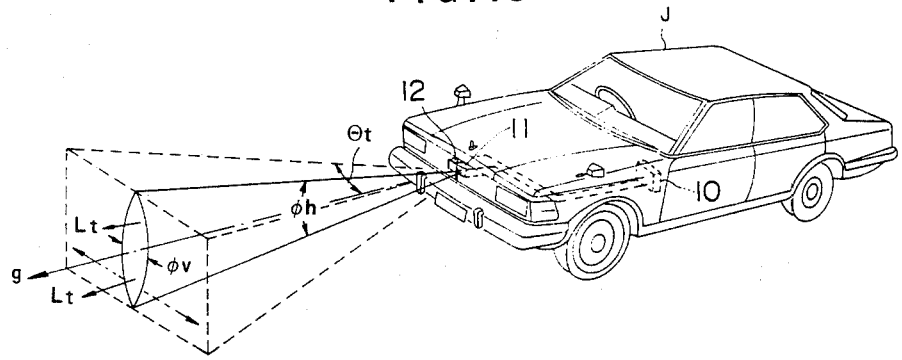
FIG. 13 is a perspective view of the radar system of FIG. 6 as mounted in the vehicle.

FIG. 13 shows the state in which optical transmitter 11, optical receiver 12 and control unit 10 are actually mounted and search beam Lt is transmitted.

As described above, mirror rotating device 117 rotates mirror 116 by an angle $\theta_2$ corresponding to current Id. The relationship between current Id and angle $\theta_2$ is shown in FIG. 14.

Figure 14:
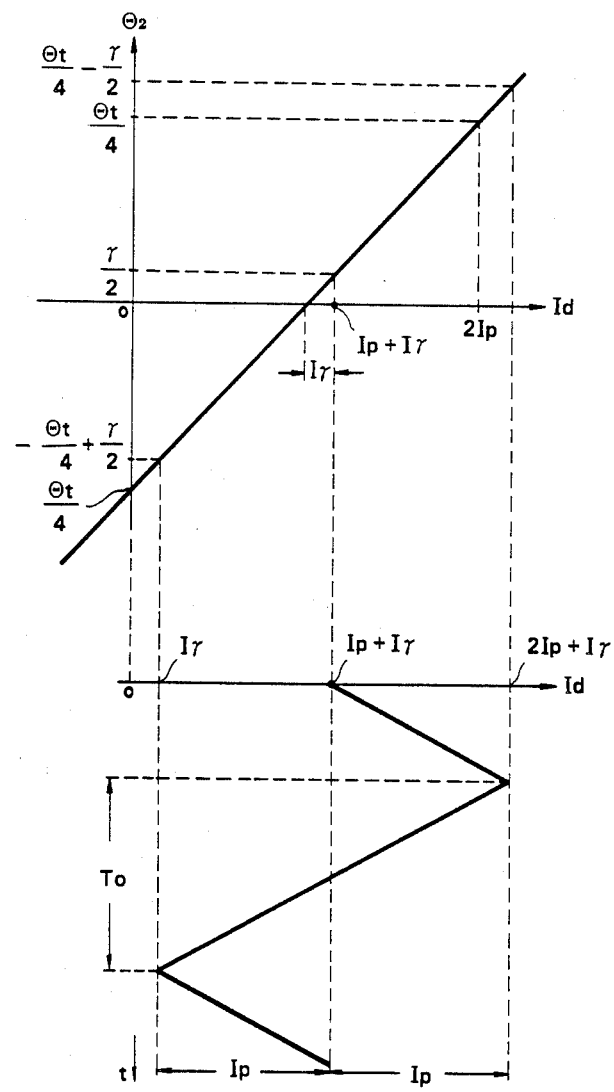
FIG. 14 is a graph of the relationship between the electric current supplied to the mirror rotating device and the rotating angle of the deflection mirror.

Id supplied by drive unit 18 changes in the form of a triangular waveform with a period of $2T_0$ and an amplitude $2Ip$ so that mirror 116 repeatedly swivels with a period of $2T_0$, as shown in FIG. 14.

If the scan range (sweep width) of search beam Lt is $\theta_t$ and the central angle $\gamma$ of the scan field (the angle subtended by the center line of the scan field and the optical axis g of the transmitter 11) is $\gamma$, the relation between current value Id and rotating angle $\theta_2$ is represented as follows:

$$Id = I\gamma + 2Ip(t/T_0) - 2n) \qquad (2)$$

where $2n \leq (t/T_0) \leq 2n+1$, and $I\gamma$ is a constant current.

$$Id = I\gamma + 2Ip\{2(n+1) - (t/T_0)\} \qquad (3)$$

where $2n+1 \leq (t/T_0) \leq 2(n+1)$ $$\theta_2 = \frac{\gamma}{2} + \frac{\theta_t}{2}\left(\frac{t}{T_0} - 2n - \frac{1}{2}\right) \qquad (4)$$

where $2n \leq (t/T_0) \leq 2n+1$ $$\theta_2 = \frac{\gamma}{2} + \frac{\theta_t}{2}\left\{2(n+1) - \frac{1}{2} - \frac{t}{T_0}\right\} \qquad (5)$$

where $2n+1 \leq (t/T_0) \leq 2(n+1)$
where $n = 0, 1, 2, 3, \ldots$, $I\gamma$ is a constant current, and t is time.

Figure 15:
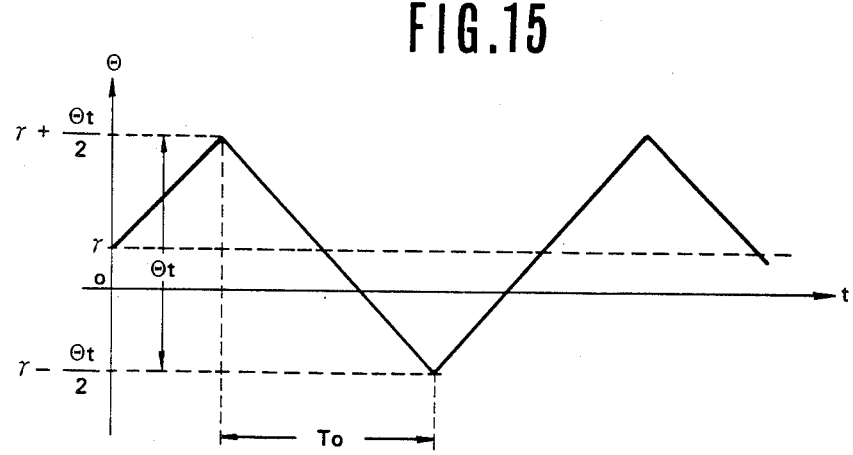
FIG. 15 is a graph illustrating changes in the direction of the search beam mediated by the deflection mirror.

Thus, the orientation of search beam Lt changes as shown in FIG. 15. At this time, the relation between the angle $\theta$ subtended by search beam Lt and optical axis g and the swing angle $\theta_t$ is represented as follows:

$$\theta = \gamma + \theta_t\left(\frac{t}{T_0} - 2n - \frac{1}{2}\right) \qquad (6)$$

where $2n \leq (t/T_0) \leq 2n+1$ $$\theta = \gamma + \theta_t\left\{2(n+1) - \frac{1}{2} - \frac{t}{T_0}\right\} \qquad (7)$$

where $2n+1 \leq (t/T_0) \leq 2(n+1)$

The central angle $\gamma$ is adjusted according to the steering angle of the vehicle which changes as the vehicle moves through a curve and is monitored by microcomputer 16. Microcomputer 16 controls the scanning of search beam Lt and performs various controls on the basis of distance data S4 from distance determiner 15, as will be described later.

Figure 16:
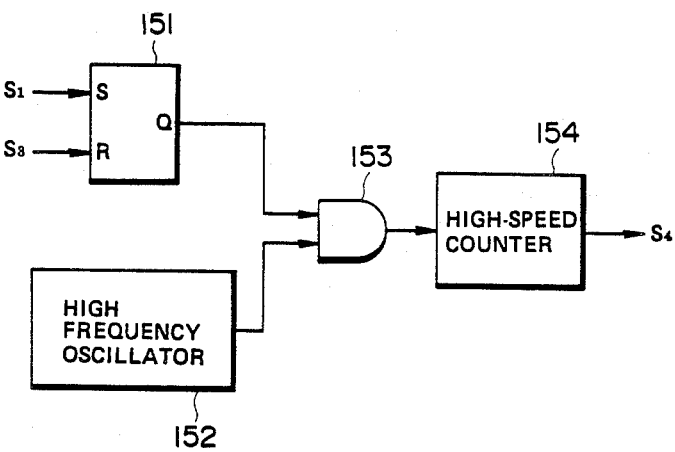
FIG. 16 is a block diagram of an embodiment of a distance determinator unit of FIG. 6.

As shown in FIG. 16, distance determiner 15 includes an RS flip-flop 151 set by trigger signal S1 generated by clock generator 13 and reset by reception signal S3 produced by wide-band amplifier 14, a high-frequency generator 152 which produces a high-frequency pulse train, an AND gate 153 and a high-speed counter 154 which counts the pulses of the pulse train. AND gate 153 is opened by the output of RS flip-flop 151 during the time lag between trigger signal S1 and reception signal S3, thereby supplying the high-speed pulse train to counter 151.

Thus, counter 154 outputs count data corresponding to this time lag which is supplied as distance data signal S4 to microcomputer 16.

Steering sensor 19 senses the angle of the steering wheel and includes, for example, a potentiometer mounted on the steering wheel, the potentiometer output being supplied as a binary code signal S5 to microcomputer 16.

Figure 17:
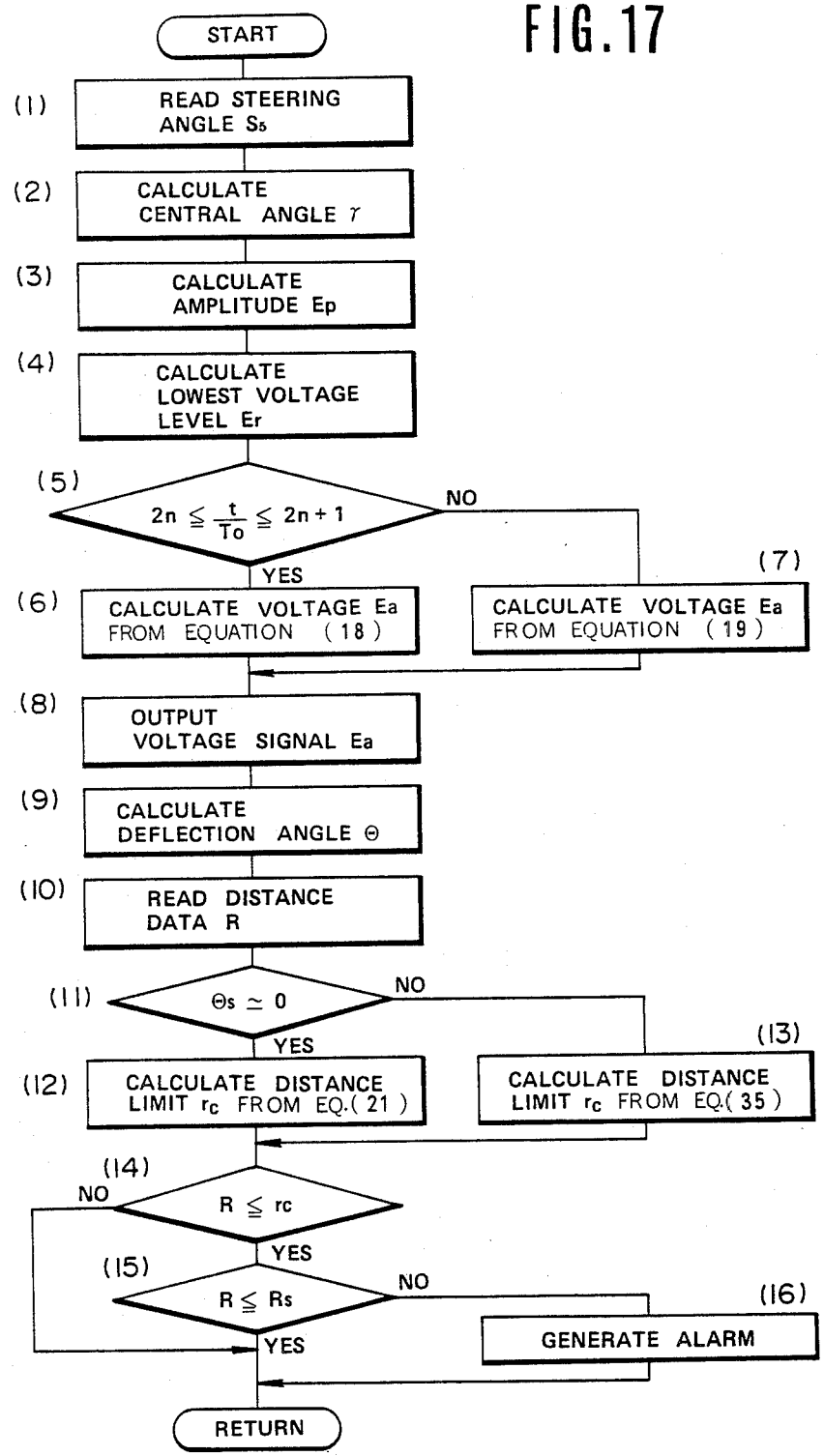
FIG. 17 is a flowchart of the program executed by a microcomputer of the radar system of FIG. 6.

FIG. 17 is a flowchart of the operations executed by microcomputer 16 which can be broken down into three main procedures, namely, a scan control which controls the deflection of search beam Lt in accordance with the radius of curvature of the road along which the vehicle travels i.e., on the basis of steering angle data from steering angle sensor 19 to sense objects present ahead within the curved road portion; a detection distance limit value control which controls the detection distance limit value along both sides of the vehicle lane so as not to detect objects present in adjacent lanes; and a distance discrimination which discriminates whether the distances to the objects present within the detection range of the radar system are beyond a safe inter-vehicle distance and thereby whether there is any dange of rear-end collision.

The above scan control process includes reading data $S_5$ corresponding to the steering angle $\theta_s$ of the steering wheel from steering angle sensor 19 at step (1) and deriving the central angle $\gamma$ of the scan angle $\theta_t$ of search light Lt on the basis of angle $\theta_s$ at a step (2). At this time, microcomputer 16 send a control signal $S_6$, which sets the central angle of search beam Lt to $\gamma$, via D/A convertor 17 to deflector drive circuit 18, thereby rotating mirror 116 through a corresponding angle.

Figure 20:
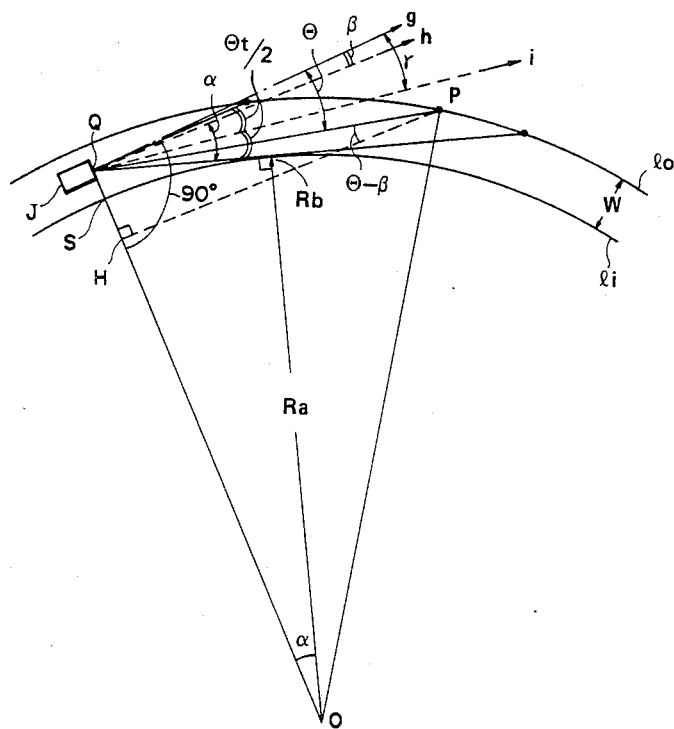
FIG. 20 is a diagram of the operation of the radar system when the vehicle is travelling along a curved road.

Calculation of the central angle $\gamma$ for use in calculating voltage signal Ea will be described below. As shown in FIG. 20, the central angle $\gamma$ represents the angle subtended by central axis i of scan angle $\theta_t$ of search beam Lt and optical axis g of optical transmitter 11. Changing the central angle $\gamma$ in accordance with the sensed steering angle of the vehivle enables objects in front of the vehicle to be detected, even around curves. The central angle $\gamma$ is set such that the radially inward extreme of search beam Lt (achieved when the deflection angle $\theta$ reaches its inward extreme) will be tangent to the radially inward edge li of the road lane. If the angle subtended by an axis h, which is perpendicular to a line segment OQ connecting the center Q of the front of the vehicle J and the center of curvature O of the curved lane, and the tangent to the lane boundary li is labelled "$\alpha$", then the central angle $\gamma$ can be expressed as follows:

$$\gamma = \beta + \alpha - \theta_t/2 \quad (8)$$

where $\beta$ is referred to as actual steering angle, that is, the angle between the axis h of the front wheels and the longitudinal axis of the vehicle, i.e., optical axis g. This actual steering angle $\beta$ is represented according to Ackerman's revolution theory as follows:

$$|\beta| \approx Lh/Ra \quad (9)$$

where Ra is a radius of curvature of the curve and Lh is the length of wheel base of the vehicle. Actual steering angle $\beta$ can also be expressed as follows:

$$\beta \approx k \cdot \theta_s \quad (10)$$

where k is a constant and $\theta_s$ is the actual steering angle as measured by sensor 19, and $\beta$ is proportional to the steering angle $\theta s$ of steering wheel.

The values of $\alpha$ and $\beta$ of formula (8) cannot be measured directly, so that the central angle $\gamma$ must be calculated from other known data, which will be described briefly below.

If vehicle J is assumed to travel along the centerline of a lane having a width of W, then, since angle $\alpha$ is equal to the angle at the center of curvature O of the lane between the center of the front Q of the vehicle J and the tangential point $R_b$ of the search beam . . .

$$\cos \alpha = ORb/OQ = Ra/(Ra+W/2) \quad (11)$$

In formula (11), since Ra $>>$ W, $$Ra/(Ra+W/2) \approx 1 - (W/2Ra)$$

In addition, $\alpha < 1$, thus, $\cos \alpha \approx 1 - (\alpha^2/2)$ therefore, $$\alpha = \sqrt{W/Ra} \quad (12)$$

thus, substituting formulae (9) and (12) into formula (8), $$\gamma \approx \frac{Lh}{Ra} + \frac{W}{Ra} - \frac{Q_t}{2} \quad (13)$$

Since radius of curvature Ra of formula (13) is an unknown value, and from formulas (9) and (10), $$Ra \approx Lh/k|\theta s| \quad (14)$$

substituting Ra into (13), $$\gamma \approx k \cdot \theta_s + \sqrt{k \cdot \theta_s \cdot W/Lh} - (\theta_t/2) \quad (15)$$

Therefore, once the steering angle $\theta$s of steering wheel is known, the central angle $\gamma$ can be calculated.

Figure 18:
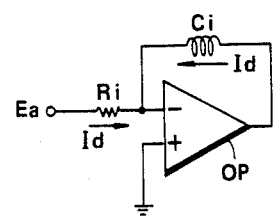
FIG. 18 is a circuit diagram of a deflector drive unit.
Figure 19:
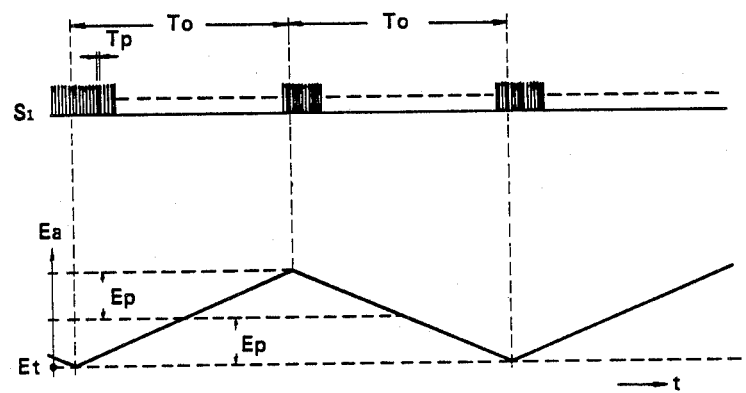
FIG. 19 is a graph of the waveform of a signal fed to the deflector drive unit.

Deflector drive circuit 18, which includes an operational amplifier OP, changes the current Id flowing through coil Ci wound on movable magnet 33 of mirror rotating device 117 in accordance with changes in the voltage signal Ea supplied thereto, as shown in FIG. 18. The voltage signal Ea is a triangular waveform signal which has a period of $2T_0$, an amplitude of Ep and a lower voltage lever Er, as shown in FIG. 19. In this embodiment, the value of period $2T_0$ is selected such that $T_0 = 512Tp$, so that during time $T_0$, 512 pulses of search beam Lt are transmitted. Amplitude Ep of voltage signal Ea and lower voltage level Er have the following relationship and are calculated at steps (3) and (4) of FIG. 17:

$$Ep = Ip \cdot Ri = K \cdot \theta_t/2 \quad (16)$$

$$Er = Ir \cdot Ri = K \cdot r - Ep \quad (17)$$

where $\theta_t$ is the scan angle of $\approx 70$ mrad of search beam Lt, Ri is the input resistance of operational amplifier OP of deflector drive circuit 18 and K is a constant determined by the characteristics of mirror drive circuit 117.

Calculation of voltage Ea is performed at steps (5), (6) and (7) in correspondance with elapsed time in order to conform voltage signal Ea to a triangular waveform such as shown in FIG. 19, as follows:

$$Ea = Er + 2Ep(t/T_0) - 2n) \quad (18)$$

where $2n \leq (t/T_0) \leq 2n+1$ $$Ea = Er + 2Ep\{2(n+1) - (t/T_0)\} \quad (19)$$

where $2n+1 < (t/T_0) < 2(n+1)$

In this way, voltage signal Ea such as shown in FIG. 19 is fed to deflector drive unit 18, thereby rotating deflection mirror 116 repeatedly (step (8)).

Next, the detection distance limit value rc is calculated in order to prevent detection of objects outside out of the lane.

This is calculated on the basis of the deflection angle $\theta$ of search beam Lt. At a step (9) of the flowchart of FIG. 17, the deflection angle $\theta$ is calculated from voltage Ea derived at step (6) or (7) on the basis of the following formula (20) derived from formulae (16) and (17):

$$\theta = 2\theta_2 = Ea/k \quad (20)$$

After signal $S_4$ indicative of the distance R to the detected object is received from distance determinator 15 in step (10), then the magnitude of the steering angle $\theta s$ is checked at step (11). If $|\theta s| \leq 0.05$, then the vehicle is determined to be moving along a straight road whereas if the result is NO, the vehicle is determined to be moving along a curved road.

When the vehicle is determined to be moving straight ahead at step (11), the program goes to a step (12) to derive a detection distance limit rc by the following formula (21):

$$rc = W/2|\theta| \qquad (21)$$

Figure 21:
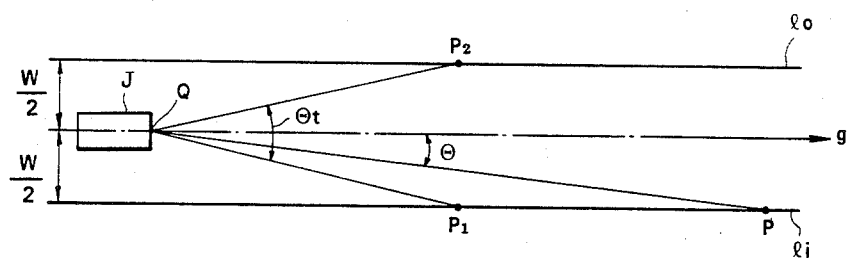
FIG. 21 is a diagram of the operation of the radar system when the vehicle is travelling along a straight road.

That is, if vehicle J is travelling along the centerline of a straight road, as shown in FIG. 21, the detection distance limit rc is the distance to the point P where search beam Lt transmitted at a deflection angle of $\theta$ intersects the vehicle lane border li. If the width of the vehicle lane is W, rc is given by formula (21).

On the other hand, when the vehicle is determined to be travelling along a curved road, the program goes to step (13) to derive the detection distance limit rc in accordance with the calculations described below.

When the vehicle is travelling along a curved road, the deflection angle $\theta$ of search beam Lt, as shown in FIG. 20, is in the following range:

$$\gamma - \theta_t/2 \leq \theta \leq \gamma + \theta_t/2 \qquad (22)$$

whereby search beam Lt scans through a range of $\theta_t$ centered on angle $\gamma$.

If a point where search beam Lt transmitted at a deflection $\theta$ intersects the outer curved borderline $l_0$ of the vehicle lane is P, and the point where a line extending from P normal to a line segment OQ intersects segment OQ is H, the following expressions hold:

Line segment $QH = rc \cdot \sin(\theta - \beta)$ (23)

Line segment $PH = rc \cdot \cos(\theta - \beta)$ (24)

Since the length of $OQ = Ra + W/2$, from formula (23):

Line segment $OH$ (25)
$= $ Line segment $OQ - $ Line segment $QH$
$= (Ra + W/2) - rc \cdot \sin(\theta - \beta)$ Applying the Pythagorean theorem to triangle $\triangle OHP$, $(\text{Segment } PH)^2 + (\text{Segment } OH)^2 = (\text{Segment } PO)^2$ (26)

where

Segment $PO = Ra + W$ (27)

Substituting formulae (24), (25) and (27) into formula (26), $$rc^2 \cdot \cos^2(\theta-\beta) + \{Ra + W/2 - rc \cdot \sin(\theta-\beta)\}^2 = (Ra+W)^2 \qquad (28)$$

From formulae (22), (8) and (16), $$\theta - \beta \leq \gamma - \beta + \theta_t/2 = \alpha \approx \sqrt{W/Ra} \qquad (29)$$

If, for example, the radius of curvature of the curve $Ra \geq 1{,}000$ m and the width of the vehicle lane $W \approx 4$ m, formula (29) gives:

$$\theta - \beta \leq 0.06 << 1 \qquad (30)$$

Thus, $$\cos^2(\theta-\beta) \approx 1 - (\theta-\beta)^2 \qquad (31)$$

$$\sin(\theta-\beta) \approx \theta-\beta \qquad (32)$$

Substituting these formulae (31) and (32) into formula (28), the detection distance limit rc can be derived from the following formula:

$$rc \approx \left(Ra + \frac{W}{2}\right)(\theta-\beta) \pm \sqrt{\left(Ra + \frac{W}{2}\right)^2 (\theta-\beta)^2 + \left(RaW + \frac{3W}{4}\right)^2} \qquad (33)$$

Performing an approximation on formula (33) and rearranging the result, since $rc \geq 0$ $$rc \approx \{(\theta-\beta) + \sqrt{(\theta-\beta)^2 + W/Ra}\} Ra \qquad (34)$$

Since the radius of curvature Ra is a unknown numerical value, if Ra is eliminated using formula (18), the detection distance limit rc could then be derived as a function of steering angle $\theta s$ as shown in the following formula:

$$rc \approx \left\{(\theta-\beta) + \sqrt{(\theta-\beta)^2 + \frac{k\theta s W}{Lh}}\right\} \cdot \frac{Lh}{k\theta s} \qquad (35)$$

Calculation of rc in accordance with formula (35) results in reliable detection of objects in the curved lane concerned without detecting other objects in the adjoining lanes.

The avoidance of objects outside of the lane in which the vehicle is travelling is actually effected at a step (14) wherein the distance R to the object in front of the vehicle is checked to see whether it is less than rc derived from formula (21) or (35), and when R is greater than rc, the object is determined to be outside of the lane concerned, and accordingly, the distance data is ignored thereafter, i.e. the program ends immediately.

When an object is detected within the lane of the vehicle, the probability of collision is determined according to the distance to the object.

That is, at a step (15), the distance R to the object is compared to the minimum braking distance Rs derived in correspondance with to the current vehicle speed. When distance R to the object is determined to be less than braking distance Rs, there is a high probability of collision and at a step (16), an output is produced to generate an alarm.

The braking distance Rs is a distance that the vehicle will cover before coming to rest after the driver notices the object and begins to brake the vehicle as hard as possible, and is calculated on the basis of the vehicle speed sensed by a speed sensor (not shown), using another processing routine (not shown), employing the following expression:

$$Rs = V_a \cdot T_d + V_a^2/2\alpha_0 \qquad (36)$$

where Va is the vehicle speed, $\alpha_0$ is the deceleration setting, and Td is a response delay time.

Thus, whether the vehicle is travelling along a straight road or a curved road, the above processes enable objects present in the lane in which the vehicle is moving to be detected reliably and enable the distances to the objects to be measured, thereby resulting in a high-performance optical radar.

Connection of the radar illustrated in the above embodiment to an automatic vehicle travel controller will facilitate more accurate follow-up travel control which could allow the preceding vehicle to be followed at an appropriate inter-vehicle distance.

The distance R to the object and the direction toward the object derived on the basis of the deflection angle $\theta$ of search beam Lt when distance R is sensed are known, which further improves the radar performance.

As described above in detail, the optical radar system for vehicles according to the present invention ensures detention of objects in the vehicle lane in front of a vehicle moving through a curve and increases the maximum detection distance while preventing detection of objects outside of the lane in question. That is, the present invention provides a high-performance optical radar.

While this invention has been described and shown in terms of a preferred embodiment thereof, it will be apparent to those skilled in the art that various modifications and changes of this invention could be made without departing from the scope of this invention as set forth in the attached claims.

What is claimed is:

1. An optical radar system for a vehicle, comprising:
   (a) first means for transmitting a search beam toward possible objects in a road along which the equipped vehicle is travelling;
   (b) second means for automatically repeatedly scanning the search beam in a scan having a variable central angle with respect to a central axis of said first means, said variable central angle depending on the direction of the vehicle's movement so as to scan parallel to and across the road surface;
   (c) third means for receiving a reflection of the search beam reflected by an object present on the road; and
   (d) fourth means for determining the distance from the vehicle to the object on the basis of the timing relationship between the transmitted search beam and the received reflection.

2. An optical radar system according to claim 1, further including means for sensing the steering angle of the vehicle and for producing a steering-angle signal indicative of the steering angle, and wherein said second means defines the orientation of the search beam relative to a central axis of said first means in accordance with the steering-angle signal.

3. An optical radar system according to claim 2, wherein said second means includes means for directing the search beam toward possible objects, said directing means having a shaft about which said directing means is pivotable so as to change the direction of the search beam, and means for moving said directing means in accordance with the steering-angle signal.

4. An optical radar system according to claim 3, wherein said directing means is a mirror and said moving means includes means for producing a magnetic field and an electromagnet disposed in the magnetic field and connected firmly to said shaft of said mirror, said electromagnet being rotated in accordance with the steering-angle signal when supplied with an electric current corresponding to the steering-angle signal, thereby pivotting said mirror and hence the search beam.

5. An optical radar system according to claim 4, wherein said shaft extends through said electromagnet and said shaft has a pair of slip rings fixed to said shaft of said mirror, one for each side of said electromagnet for allowing electric current to flow therethrough to said electromagnet for energization.

6. An optical radar system according to claim 5, further includes means for stopping said electromagnet at a position corresponding to the electric current.

7. An optical radar system according to claim 6, wherein said magnetic-field producing means includes a pair of permanent magnets aligned anti-parallelly with a spacing therebetween, said electromagnet being disposed in said spacing so as to be freely pivotable.

8. An optical radar system according to claim 4, further including a second mirror disposed so as to direct the search beam toward said first-mentioned mirror before said first-mentioned mirror re-directs the search beam.

9. An optical radar system according to claim 2, further including control means for determining whether the object is within a detection distance limit from the vehicle, and for determining whether the distance to the object is greater than a minimum braking distance through which the vehicle will travel before coming to a stop after maximum braking force is applied to the brake when the distance to the object is less than the detection distance limit.

10. An optical radar system according to claim 9, further including means for producing an alarm when the distance to the object is less than the minimum braking distance.

11. An optical radar system according to claim 9, wherein said detection distance limit is a function of the steering angle.

12. An optical radar system according to claim 9, wherein said detection distance limit is a function of the width of the road.

13. An optical radar system according to claim 9, wherein said detection distance limit is a function of the central angle.

14. An optical radar system according to claim 4, wherein said electromagnet includes an operational amplifier (OP) having negative and positive input terminals, a resistor (Ri) connected at one end to said negative input terminal for conducting the electrical current therethrough to said operational amplifier, the positive input terminal being grounded, a coil winding (Ci) connecting the negative input terminal and the output of said operational amplifier.

15. An optical radar system for a vehicle, comprising:
   (a) first means for transmitting a search beam toward possible objects in a road along which the vehicle is travelling;
   (b) second means for automatically repeatedly scanning the search beam across the road surface, including means for sensing a steering angle of the vehicle and for producing a steering-angle signal indicative a steering angle of the vehicle, said second means being operable for calculating the orientation of the search beam relative to an optical axis of said first means on the basis of the steering-angle signal, and for repeatedly producing a deflection angle signal to pivot the search beam, the deflection angle signal being of a periodically changing triangular waveform;

(c) third means for receiving the reflection of the search beam as reflected by an object; and (d) fourth means for determining the distance from the vehicle to the object on the basis of the timing relationship between the transmitted search beam and the received reflection.

16. An optical radar system according to claim 15, wherein said second means is further operable for detecting whether the vehicle is travelling along a straight or a curved road, for calculating a detection distance limit which varies according to whether the vehicle is travelling along a straight or a curved road, for detecting whether the distances to the objects are within the detection distance limit, and for determining whether the distances to the objects are within a braking distance through which the vehicle will travel before coming to a stop after the vehicle has been braked with a maximum force applied.

17. An optical radar system according to claim 16, wherein when the vehicle is detected to be travelling along a curved road, said measurable distance limit is approximately represented by $$\left\{ (\theta - \beta) + (\theta - \beta)^2 + \frac{K\theta_s W}{Lh} \right\} \cdot \frac{Lh}{K|\theta_s|}$$

where $\theta$ is the deflection angle of the beam, $\beta$ is the angle between the optical axis of said transmitter means and the direction in which front road wheels roll, $Lh$ is the wheel base of the vehicle, $W$ is the width of the road and $\theta_s$ is the steering angle of the vehicle.

18. An optical radar system according to claim 16, wherein when the vehicle is detected to be travelling along a straight line said detection distance limit rc is represented by $W/2|\theta|$ where $W$ is the width of the road and $|\theta|$ is a deflection angle of the search beam.

19. An optical radar system according to claim 16, wherein said braking distance is represented by $Va \cdot Td + Va^2/2\alpha_0$ where $Va$ is vehicle speed, $Td$ is a time required from when the driver has detected the objects to when he begins to brake the vehicle, and $\alpha_0$ is a deceleration factor which depends on the structure of the vehicle.

20. An optical radar system according to claim 15, wherein said control means is also operable for calculating a second angle between the axis of scanning of said search beam and the optical axis of said transmitter means on the basis of the steering angle signal, calculating an electrical signal defining one extreme of scan of the search beam on the basis of the second angle, said electrical signal being of a periodic triangular waveform.

21. A method of detecting and ranging objects in a road on which a vehicle travels, comprising the steps of:

(a) transmitting a search beam toward the objects;

(b) automatically scanning the search beam repeatedly in a scan having a variable central angle with respect to a central axis of said first means, said variable central angle depending on the direction of the vehicle's movement so as to scan across the road surface;

(c) receiving a reflection of the search beam reflected by an object; and (d) determining the distance from the vehicle to the object on the basis of the timing relationship between the transmitted search beam and the received reflection.

22. A method according to claim 21, further including sensing a steering angle of the vehicle, and determining a deflection angle of the search beam on the basis of the sensed steering angle.

23. A method according to claim 22, wherein the step of determining a deflection angle includes the step of determining one extreme of the scan of the search beam.

24. A method according to claim 23, further including the step of determining whether the vehicle is travelling along a straight road or along a curved road, calculating a detection distance limit in accordance with the result of the immediately preceding step, determining whether the distances to the objects are less than the calculated detection distance limit, determining whether the distances to the objects are less than a braking distance through which the vehicle travels during the tme required for the driver to recognize the objects, brake the vehicle with a predetermined braking force and bring the vehicle to a complete stop.

* * * * *